US009870141B2

(12) United States Patent
Ansell et al.

(10) Patent No.: US 9,870,141 B2
(45) Date of Patent: Jan. 16, 2018

(54) GESTURE RECOGNITION

(75) Inventors: Peter John Ansell, Watford (GB); Shahram Izadi, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 859 days.

(21) Appl. No.: 12/950,669

(22) Filed: Nov. 19, 2010

(65) Prior Publication Data

US 2012/0131514 A1    May 24, 2012

(51) Int. Cl.
*G06F 3/0488* (2013.01)
*G06F 3/0354* (2013.01)

(52) U.S. Cl.
CPC ...... *G06F 3/04883* (2013.01); *G06F 3/03543* (2013.01)

(58) Field of Classification Search
CPC ...... G06F 3/017; G06F 3/0487; G06F 3/0488; G06F 3/04883; G06F 3/04886; G06F 3/03543; G06K 9/00375
USPC ........... 715/863; 345/173–178; 346/173–178
See application file for complete search history.

(56) References Cited

U.S. PATENT DOCUMENTS

| | | | | |
|---|---|---|---|---|
| 5,583,946 A * | 12/1996 | Gourdol | .................... | 382/187 |
| 6,049,328 A * | 4/2000 | Vanderheiden | ................. | 345/173 |
| 6,067,079 A * | 5/2000 | Shieh | .................... | 345/173 |
| 6,104,317 A * | 8/2000 | Panagrossi | .................... | 341/20 |
| 6,128,003 A * | 10/2000 | Smith et al. | .................... | 345/157 |
| 6,249,606 B1 * | 6/2001 | Kiraly et al. | ................. | 382/195 |
| 6,459,424 B1 * | 10/2002 | Resman | .................... | 345/173 |
| 7,656,393 B2 * | 2/2010 | King et al. | .................... | 345/173 |
| 7,705,830 B2 | 4/2010 | Westerman et al. | | |
| 7,710,397 B2 | 5/2010 | Krah et al. | | |
| 7,808,479 B1 | 10/2010 | Hotelling et al. | | |
| 8,225,343 B2 * | 7/2012 | Miller, IV | .................... | 725/12 |

(Continued)

FOREIGN PATENT DOCUMENTS

| | | |
|---|---|---|
| EP | 1772829 | 10/2006 |
| JP | 11345082 | 12/1999 |

(Continued)

OTHER PUBLICATIONS

PCT Search Report dated Jun. 1, 2012 for PCT application No. PCT/US2011/059612, 9 pages.

(Continued)

*Primary Examiner* — Andrew Tank

(57) ABSTRACT

Gesture recognition is described. In one example, gestures performed by a user of an input device having a touch-sensitive portion are detected using a definition of a number of regions corresponding to zones on the touch-sensitive portion, each region being associated with a distinct set of gestures. Data describing movement of the user's digits on the touch-sensitive portion is received, and an associated region for the data determined. The data is compared to the associated region's set of gestures, and a gesture applicable to the data selected. A command associated with the selected gesture can then be executed. In an example, comparing the data to the set of gestures comprises positioning a threshold for each gesture relative to the start of the digit's movement. The digit's location is compared to each threshold to determine whether a threshold has been crossed, and, if so, selecting the gesture associated with that threshold.

20 Claims, 7 Drawing Sheets

(56) References Cited

U.S. PATENT DOCUMENTS

| | | | |
|---|---|---|---|
| 8,347,238 B2* | 1/2013 | Leffert et al. | 715/863 |
| 8,400,417 B2* | 3/2013 | Ording et al. | 345/173 |
| 8,479,122 B2* | 7/2013 | Hotelling et al. | 715/863 |
| 2005/0024322 A1 | 2/2005 | Kupka | |
| 2005/0146508 A1* | 7/2005 | Kirkland et al. | 345/169 |
| 2006/0007188 A1* | 1/2006 | Reiner | 345/179 |
| 2007/0152984 A1* | 7/2007 | Ording et al. | 345/173 |
| 2008/0042979 A1* | 2/2008 | Nikbin | 345/168 |
| 2008/0129686 A1* | 6/2008 | Han | 345/156 |
| 2008/0192005 A1* | 8/2008 | Elgoyhen | G06F 3/014 345/158 |
| 2009/0027357 A1 | 1/2009 | Morrison | |
| 2009/0244032 A1* | 10/2009 | Westerman et al. | 345/174 |
| 2009/0244034 A1 | 10/2009 | Chen et al. | |
| 2009/0315740 A1* | 12/2009 | Hildreth et al. | 341/20 |
| 2010/0020025 A1 | 1/2010 | Lemort et al. | |
| 2010/0060576 A1* | 3/2010 | Underkoffler et al. | 345/158 |
| 2010/0083190 A1* | 4/2010 | Roberts et al. | 715/863 |
| 2010/0115473 A1 | 5/2010 | Reeves et al. | |
| 2010/0134425 A1 | 6/2010 | Storrusten | |
| 2010/0138785 A1* | 6/2010 | Uoi et al. | 715/810 |
| 2010/0149090 A1 | 6/2010 | Morris et al. | |
| 2010/0207887 A1* | 8/2010 | Jepsen | H03M 11/14 345/168 |
| 2011/0066984 A1* | 3/2011 | Li | 715/863 |
| 2011/0102319 A1 | 5/2011 | Lin et al. | |
| 2011/0181526 A1* | 7/2011 | Shaffer et al. | 345/173 |
| 2011/0254791 A1* | 10/2011 | Wong et al. | 345/173 |
| 2012/0182296 A1* | 7/2012 | Han | G06F 3/04883 345/419 |
| 2012/0188164 A1* | 7/2012 | Dey et al. | 345/163 |

FOREIGN PATENT DOCUMENTS

| | | |
|---|---|---|
| KR | 1020100034811 | 4/2010 |
| WO | 2009142871 A2 | 11/2009 |
| WO | 2009142879 A2 | 11/2009 |

OTHER PUBLICATIONS

Alexa, "MagicPrefs", retrieved on Jul. 28, 2010 at <<http://magicprefs.com/>>, VAOR, 2009, pp. 1-2.

Dohse, et al., "Enhancing Multi-user Interaction with Multi-touch Tabletop Displays using Hand Tracking", retrieved on Jul. 28, 2010 at <<http://www.hci.iastate.edu/REU09/pub/Main/Multi-touchTableBlog/achi-2008_touchtable.pdf>>, Conference on Advances in Computer-Human Interaction (ACHI), Sainte Luce, Martinique, Feb. 2008, pp. 297-302.

"Magic Mouse: Suddenly, everything clicks. And swipes. And scrolls.", retrieved on Dec. 7, 2010 at <<http://www.apple.com/magicmouse/>>, 2010, pp. 1-3.

Malik, "An Exploration of Multi-Finger Interaction on Multi-Touch Surfaces", retrieved on Jul. 28, 2010 at <<http://www.cs.utoronto.ca/~smalik/downloads/malik_2007_thesis_multi_finger_final.pdf>>, Doctoral Thesis, University of Toronto, 2007, pp. 1-184.

Rekimoto, "SmartSkin: An Infrastructure for Freehand Manipulation on Interactive Surfaces", retrieved on Jul. 28, 2010 at <<http://ftp.csl.sony.co.jp/person/rekimoto/papers/chi02.pdf>>, ACM, Conference on Human Factors in Computing Systems: Changing our World, Changing Ourselves (CHI), Minneapolis, Minnesota, Apr. 2002, pp. 1-8.

Wang, et al., "Detecting and Leveraging Finger Orientation for Interaction with Direct-Touch Surfaces", retrieved on Jul. 28, 2010 at <<http://research.microsoft.com/en-us/um/people/xiangc/uist2009_fingerorientation.pdf>>, ACM, Symposium on User Interface Software and Technology (UIST), Victoria, Canada, Oct. 2009, pp. 23-32.

"What is BetterTouchTool?", retrieved on Dec. 7, 2010 at <<http://boastr.net/>>, 2010, pp. 1-25.

"Office Action and Search Report Issued in Chinese Patent Application No. 201110386134.8", dated Jan. 24, 2014, 14 Pages.

"Office Action and Search Report Issued in Chinese Patent Application No. 201110386134.8", dated Aug. 4, 2014, 18 Pages.

"Office Action & Search Report Issued in Taiwan Patent Application No. 100137408", dated Mar. 7, 2016, 12 Pages.

"Third Office Action Issued in Chinese Patent Application No. 201110386134.8", dated Dec. 19, 2014, 13 Pages.

"Search Report Issued in European Patent Application No. 11842309.4", dated Apr. 18, 2017, 4 Pages.

"Office Action Issued in European Patent Application No. 11842309.4", dated May 9, 2017, 6 Pages.

* cited by examiner

GESTURE RECOGNITION

BACKGROUND

Many computing devices allow touch-based input, such as notebook computers, smart phones and tablet computers. Some of these devices also offer gesture-based input, where a gesture involves the motion of a user's hand, finger, body, etc. An example of a gesture-based input is a downwards stroke on a touch-sensor which may translate to scrolling the window.

Multi-touch gesture-based interaction techniques are also becoming increasingly popular, where the user interacts with a graphical user interface using more than one finger to control and manipulate a computer program. An example of a multi-touch gesture-based input is a pinching movement on a touch-sensor which may be used to resize (and possibly rotate) images that are being displayed.

To enable gesture-based interaction, these computing devices comprise gesture recognizers in the form of software which translates the touch sensor information into gestures which can then be mapped to software commands (e.g. scroll, zoom, etc). These gesture recognizers operate by tracking the shape of the strokes made by the user on the touch-sensor, and matching these to gesture templates in a library. However, this technique is complex and hence either uses a significant amount of processing or is slow and results in a gesture recognition lag. Furthermore, the technique can be inaccurate if the shape matching is not precise, leading to unintended commands being executed.

Furthermore, as the popularity of multi-touch input increases, new types of multi-touch input devices are also being developed. For example, multi-touch mouse devices have been developed that combine touch input with traditional cursor input in a desktop computing environment. However, these new devices bring with them new constraints and requirements in terms of gesture recognition. For example, in the case of multi-touch mouse devices, the user is holding, picking up and moving the device in normal use, which results in incidental or accidental inputs on the touch-sensor. Current gesture recognizers do not distinguish between incidental inputs on the touch-sensor and intentional gestures.

The embodiments described below are not limited to implementations which solve any or all of the disadvantages of known gesture recognition techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Gesture recognition is described. In one example, gestures performed by a user of an input device having a touch-sensitive portion are detected using a definition of a number of regions corresponding to zones on the touch-sensitive portion, each region being associated with a distinct set of gestures. Data describing movement of the user's digits on the touch-sensitive portion is received, and an associated region for the data determined. The data is compared to the associated region's set of gestures, and a gesture applicable to the data selected. A command associated with the selected gesture can then be executed. In an example, comparing the data to the set of gestures comprises positioning a threshold for each gesture relative to the start of the digit's movement. The digit's location is compared to each threshold to determine whether a threshold has been crossed, and, if so, selecting the gesture associated with that threshold.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a desktop computing system using a multi-touch mouse, the system described is provided as an example and not a limitation. As those skilled in the art will appreciate, the present examples are suitable for application in a variety of different types of computing systems, using a variety of different input devices.

Figure 1:
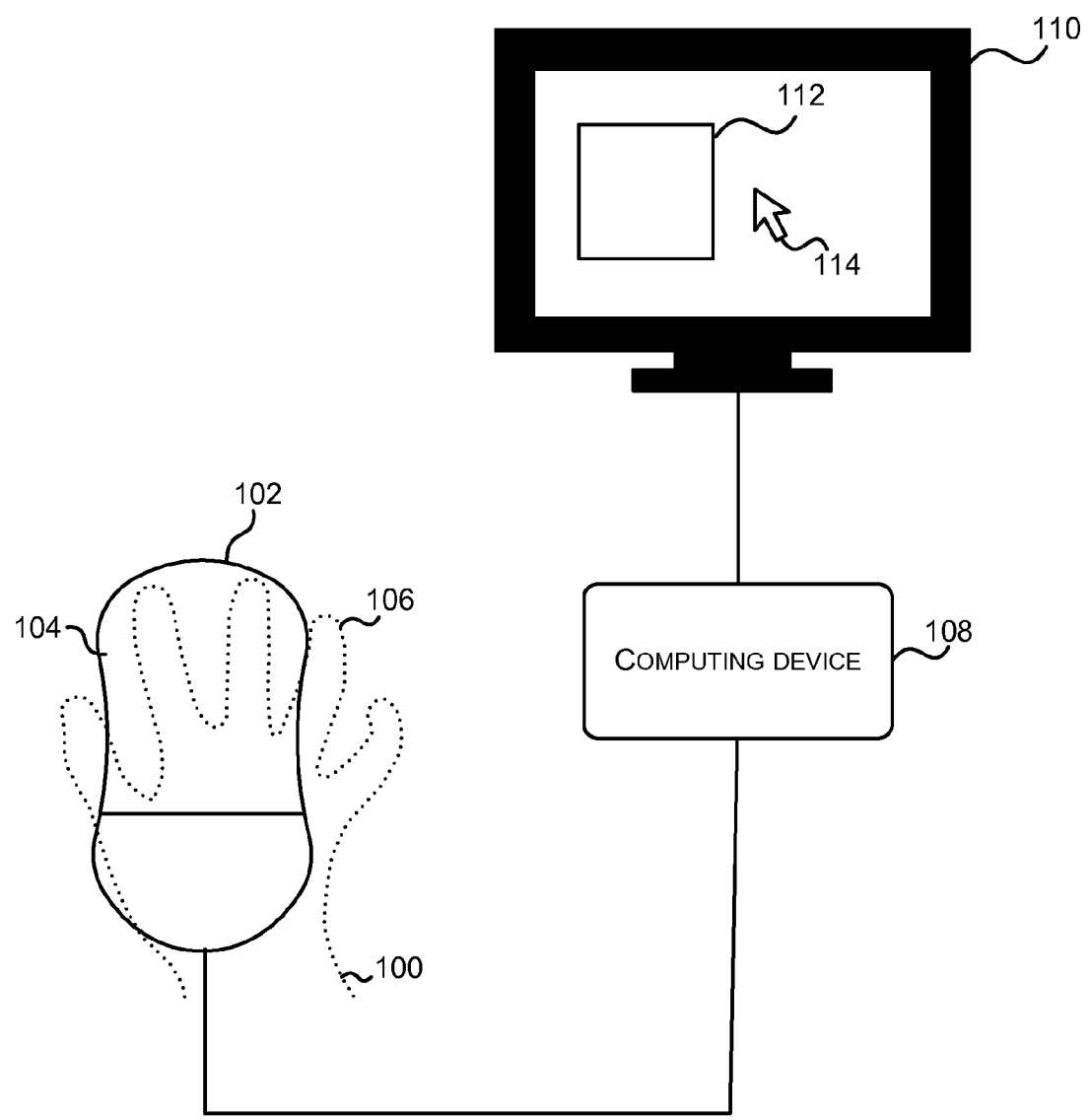
FIG. 1 illustrates a computing system having a multi-touch mouse input device.

Reference is first made to FIG. 1 which illustrates a computing system having a multi-touch mouse input device. A user is using their hand 100 to operate an input device 102. In the example shown in FIG. 1, the input device 102 is a multi-touch mouse device. The term "multi-touch mouse device" is used herein to describe any device that can operate as a pointing device by being moved by the user and can also sense gestures performed by the user's digits.

The input device 102 of FIG. 1 comprises a touch-sensitive portion 104 on its upper surface that can sense the location of one or more digits 106 of the user. The touch-sensitive portion can, for example, comprise a capacitive or resistive touch sensor. In other examples, optical (camera-based) or mechanical touch sensors can also be used. In further examples, the touch-sensitive region can be located at an alternative position, such as to the side of the input device.

The input device 102 is in communication with a computing device 108. The communication between the input device 102 and the computing device 108 can be in the form of a wireless connection (e.g. Bluetooth) or a wired connection (e.g. USB). More detail is provided on the internal structure of the computing device with reference to FIG. 7, below. The computing device 108 is connected to a display device 110, and is arranged to control the display device 110 to display a graphical user interface to the user. The graphical user interface can, for example, comprise one or more on-screen objects 112 and a cursor 114.

In use, the user can move the input device 102 (in the case of a multi-touch mouse) over a supporting surface using their hand 100, and the computing device 108 receives data relating to this motion and translates this to movement of the on-screen cursor 114 displayed on the display device 110. In addition, the user can use their digits 106 to perform gestures on the touch-sensitive portion 104 of the input device 102, and data relating to the movement of the digits is provided to the computing device 108. The computing device 108 can analyze the movement of the digits 106 to recognize a gesture, and then execute an associated command, for example to manipulate on-screen object 112.

Note that in alternative examples to that shown in FIG. 1, different types of input device can be used. For example, the input device can be in the form of a touch-pad or the display device 108 can be a touch-sensitive screen. Any type of input device that is capable of providing data relating to gestures performed by a user can be used.

Figure 2:
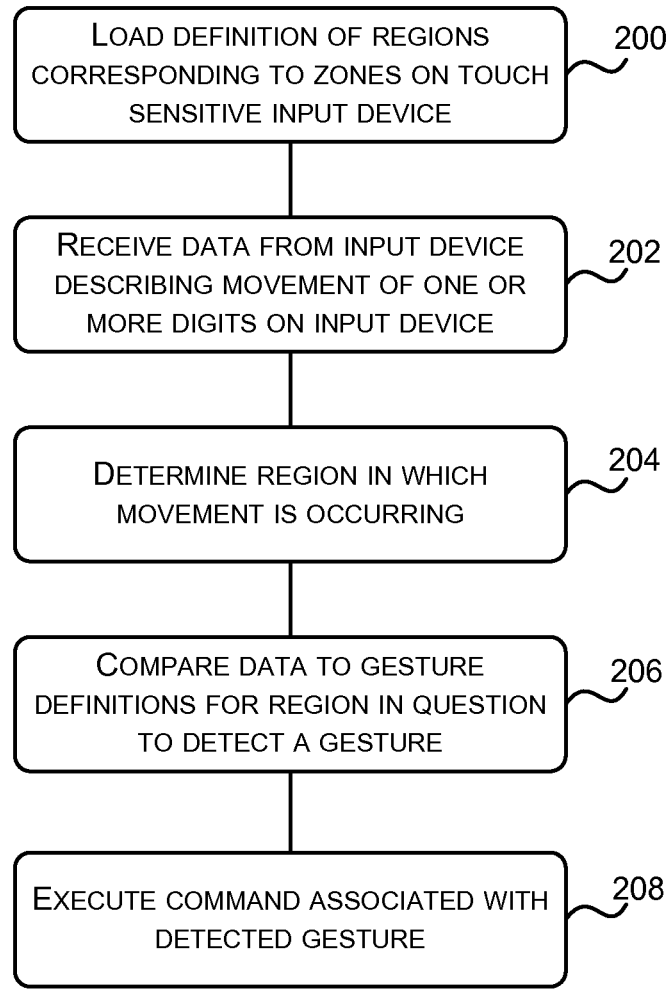
FIG. 2 illustrates a flowchart of a process for recognizing a gesture on a touch-sensitive input device.

Reference is now made to FIG. 2, which illustrates a flowchart of process for recognizing a gesture performed on a touch-sensitive input device. The flowchart of FIG. 2 can, for example, be performed on a processor at the computing device 108. However, note that in further examples, at least part of the functionality of FIG. 2 can be performed at the input device.

Firstly, the computing device 108 loads a definition of a plurality of regions. The plurality of regions correspond to zones located on the touch-sensitive portion 104 of the input device 102. The zones on the touch-sensitive portion 104 of the input device 102 are associated with one or more digits of the user. This is illustrated with an example in FIG. 3, which shows the input device 102 having touch-sensitive portion 104 divided into a number of zones.

A first zone 300 corresponds to an area on the touch-sensitive portion that is predominantly touched by the user's thumb. Therefore, it can be envisaged that gestures that start from this first zone 300 are likely to be performed by the thumb (and potentially some other digits as well). A second zone 302 corresponds to an area on the touch-sensitive portion that is predominantly touched by the user's fingers. A third zone 304 is an overlap zone between the first and second zones, where either a finger or thumb are likely to touch the touch-sensitive portion. A fourth zone 306 corresponds to an area of the touch-sensitive portion 104 that the user is likely to touch when performing fine-scale scrolling gestures (e.g. in a similar location to a scroll-wheel on a regular mouse device). Note that, in some examples, the regions may not be marked on the input device, and hence may not be directly visible to the user.

Figure 3:
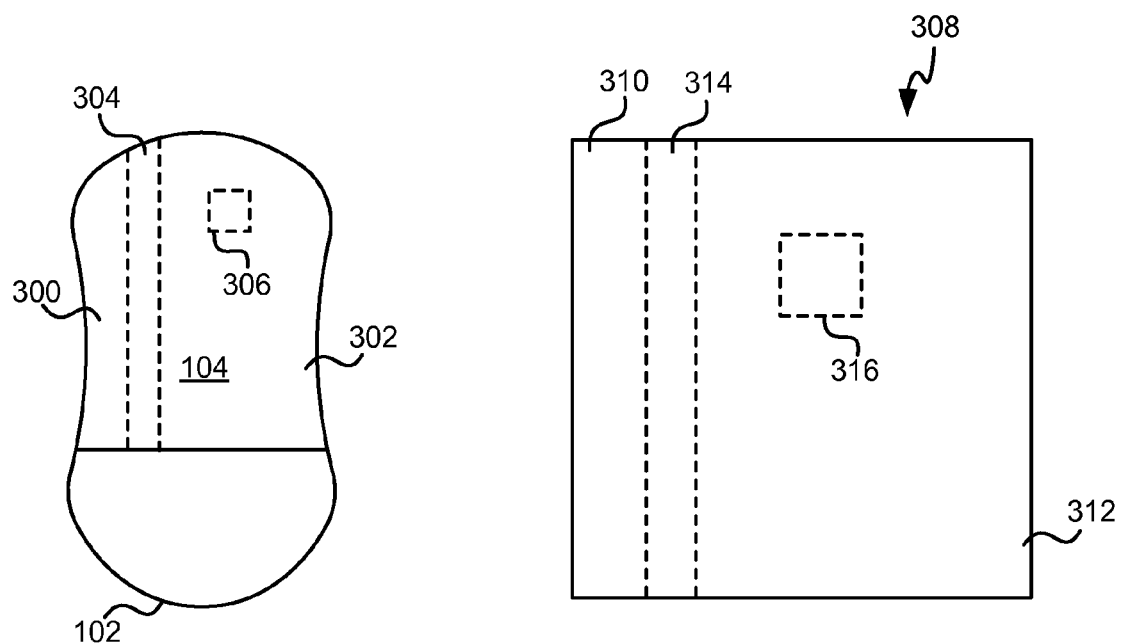
FIG. 3 illustrates a mapping of zones on an input device to a region definition.

FIG. 3 also shows a definition of a plurality of regions 308 corresponding to the zones on the touch-sensitive portion 104. The definition of the plurality of regions 308 can be in the form of a computer-readable or mathematical definition of where on the touch-sensitive portion 104 the zones are located. For example, a coordinate system relative to the touch sensor of the touch-sensitive portion can be defined, and the plurality of regions defined using these coordinates.

The example of FIG. 3 has a first region 310 corresponding to the first zone 300 (e.g. the thumb zone), a second region 312 corresponding to the second zone 302 (e.g. the finger zone), a third region 314 corresponding to the third zone 304 (e.g. the overlap zone), and a fourth region 316 corresponding to the fourth zone 306 (e.g. the sensitive scroll zone).

Therefore, by using the definition of the plurality of regions 308, the computing device 108 can determine which zone of the touch-sensitive portion 104 a detected touch is located in, from the coordinates of the detected touch. Note that, in other examples, many other zones can also be present, and they can be positioned and/or oriented a different manner. Also note that whilst the definition of the plurality of regions 308 is shown as a rectangular shape in FIG. 3, it can be any shape that maps onto the coordinates of the touch-sensor of the input device 102.

The shape, size and location of the zones on the input device can, in one example, be determined in advance and static. For example, the shape, size and location of the zones can be optimized in advance using data from users of the input device, such that they are positioned so as to be effective for the majority of users. In alternative examples, the zones can be dynamically defined, such that they change according to the behavior of the individual user.

Returning again to FIG. 2, the definition of the plurality of regions can, for example, be loaded from a storage device or memory at the computing device 108. This can be performed in advance of the user using the input device (e.g. as part of loading a device driver).

The computing device 108 receives 202 data from the input device 102 describing the location and movement of one or more digits 106 of the user on the touch-sensitive portion 104 of the input device 102. The data can be in the form of a time-sequence of frames comprising coordinates (e.g. x and y values) for each digit in contact with the touch-sensitive portion 104. The location of a digit touching the touch-sensitive portion is referred to herein as a contact point. Note that the data can describe more than one contact point.

The computing device 108 processes the data to determine whether there is movement of the contact points from frame to frame. If so, and movement of a digit is detected, then the starting coordinate of the movement is stored. Conversely, if the computing device 108 determines that a contact point has not moved for greater than a predefined time period, then any starting coordinate that is currently stored for that contact point is replaced with the current coordinate for that contact point. This helps to discriminate between intentional and unintentional movement of the digits on the input device, and helps to compensate for noise or jitter in the signal from the touch-sensor.

Once a start coordinate of a digit has been recorded, the definition of the plurality of regions 308 can be used to determine 204 the region in which the contact point is located. For example, this can be performed by locating the start coordinate on the definition of the plurality of regions, and identifying which region it is within. This region is then associated with the contact point having that start coordinate.

Each region in the plurality of regions is associated with a distinct set of gestures. In other words, every region has a set of gestures that can be entered on the input device when starting from that region. The sets of gestures for different regions may intersect (i.e. have some gestures in common). The set of gestures for the region associated with the contact point in question is accessed, and compared 206 to the data relating to the movement of the contract point. The comparison of the data to the set of gestures determines whether the movement of one or more of the contact points is sufficient to detect a gesture from the set of gestures. More detail on the gesture detection technique is provided below with reference to FIG. 4.

The detected gesture can be a momentary gesture (also known as an impulse gesture) such as a tap or flick, or a continuous gesture (also known as an interactive gesture) such as a swipe, pan, or pinch. If a gesture is detected, then this gesture is selected and a command or function associated with the gesture is executed 208. The command can be a momentary command that acts immediately upon software executed at the computing device 108, such as a command to maximize, minimize or switch a window. The command can also be a continuous command that is controlled according to an argument. For example, if the command is a zoom, rotate, scale or scroll command, then the computing device generates an output value from the data relating to the magnitude and/or direction of the movement of the contact points, and provides this as the argument to the command. In this case, the command is continuous after being triggered, and reacts to the movement of the user's digits.

The above-described gesture recognition technique provides a fast and accurate way of detecting and reacting to gestures made by a user on an input device. This technique uses knowledge of how the input device is operated by the user to identify regions associated with certain gestures, and only those gestures associated with a region in which the movement is occurring is searched. This reduces the number of gestures that are searched by the recognition technique, and speeds up the detection. By re-setting the starting coordinates of a movement after a predefined time period, only positive movements are reacted to, and unintentional triggering of the gestures is reduced.

Figure 4:
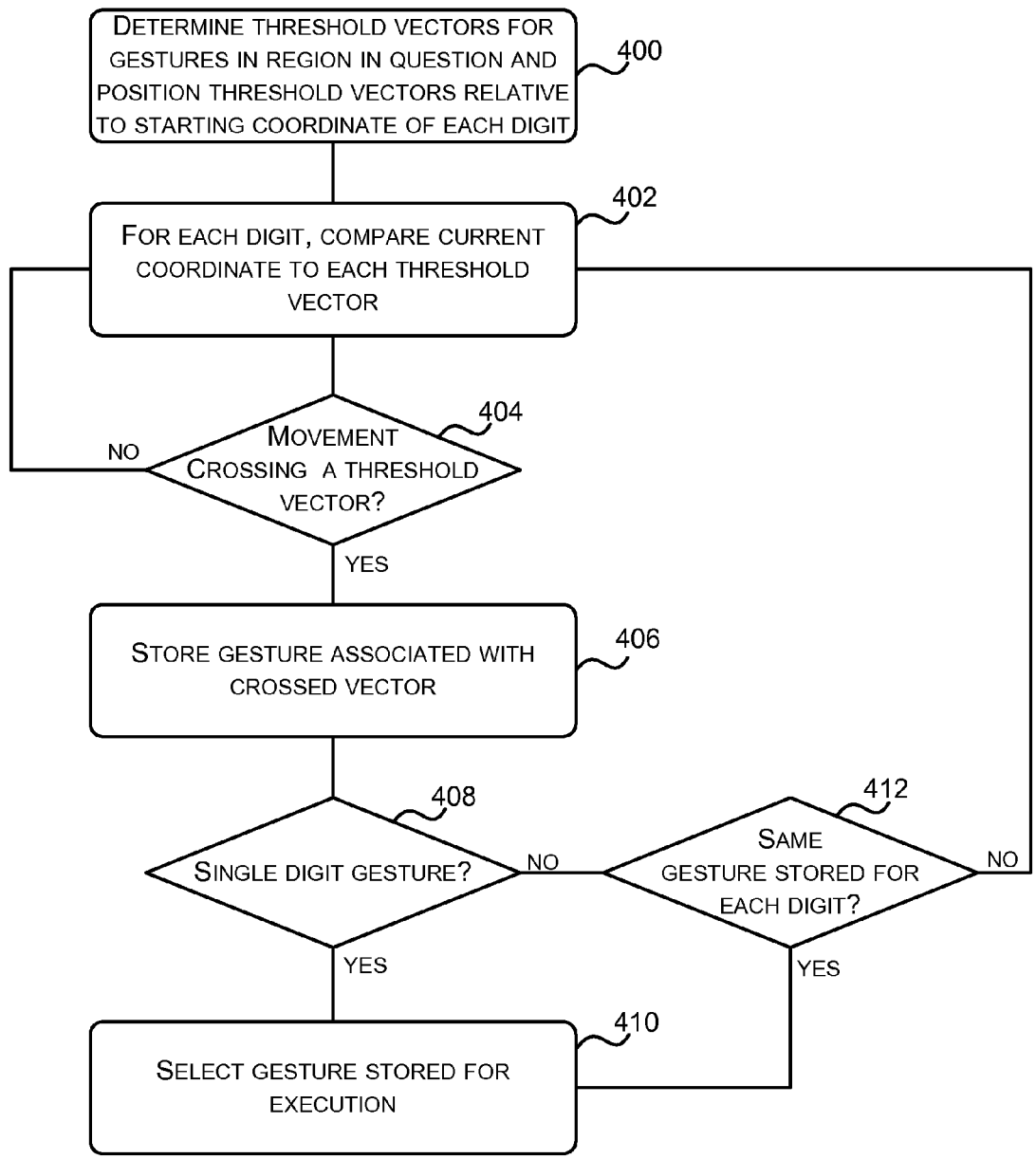
FIG. 4 illustrates a flowchart of a process for detecting a gesture.

Reference is now made to FIG. 4, which illustrates a flowchart of a gesture detection process that can be used with the technique described above with reference to FIG. 3. The gesture detection process of FIG. 4 is based on the concept of "thresholds", which can be viewed conceptually as lines drawn on the definition of the plurality of regions 308, and which must be crossed for a gesture to be detected. These thresholds can be in the form of straight lines or curved lines, and are referred to herein as "threshold vectors".

Each gesture in each set of gestures is associated with at least one threshold vector. When movement of a contact point on the touch-sensitive portion 104 is detected, and a start coordinate is recorded, then the threshold vectors for each of the gestures applicable to the region in which the start coordinate is located are determined 400. The threshold vectors are defined with reference to the start coordinate. Conceptually, this can be envisaged as placing each threshold vector for the gestures that are available in the region in question at a predefined location relative to the start coordinate of the contact point.

As an illustrative example, consider a contact point having a start coordinate of (7,12). The set of gestures for the region in which point (7,12) exists has, for example, two threshold vectors: a first one having a displacement of 5 units vertically upwards, and 3 units to the left; and a second having a displacement of 2 units vertically downwards, and 4 units to the right. Therefore, in this example, the computing device determines that the origin of the threshold vectors need to be located at (12,9) and (5,16). The threshold vectors also have a magnitude and direction (and/or optionally curvature) starting from these origins.

In some examples, the set of thresholds can also be made dependent on the context in terms of the contact points present. For example, the number of contact points in a region that are eligible for contributing to a gesture can be counted, and this value used to determine the threshold vectors used. As an example, if there is only one eligible contact point in a region associated with scrolling gestures, then the thresholds for the scrolling gestures can be placed closer to the start coordinate of the contact point, as this allows the gesture to be triggered more rapidly and other gestures are unlikely to be intended. Conversely, if two fingers are present in this region, then the thresholds can be placed further away from the starting coordinate, to provide more leeway for forming a multi-finger gesture.

For each contact point that is moving (i.e. has moved from a start coordinate), the current coordinate of the contact point is compared 402 to each threshold vector that applies for that contact point. In one example, the current coordinate of the contact point is compared to each threshold vector in an arbitrary sequence. In another example, each threshold vector is assigned a priority value, and the current coordinate is compared to each threshold vector in priority value order. This enables gestures that are more commonly used, or are time-sensitive, to be given a higher priority and hence are detected more rapidly than gestures with a lower priority.

It is then determined 404 whether that contact point at its current coordinate has crossed a threshold vector. If not, then the process reverts to checking after the next frame of motion in the data. If the current coordinate of a contact point indicates that the contact point has crossed a threshold vector relative to its start coordinate, then the gesture associated with the crossed threshold vector is stored 406 (e.g. in a memory or other storage device at the computing device 108).

It is then determined 408 whether the stored gesture is a gesture that can be triggered by movement of a single digit, or from the movement of a plurality of digits. If the stored gesture is a single-digit gesture, then the stored gesture is selected 410 for execution, as described above with reference to FIG. 3. If, however, the stored gesture is a multiple-digit gesture, then it is determined 412 whether the same gesture has also previously been stored as a result of the threshold vector for that gesture being crossed by sufficient additional contact points (i.e. different digits).

If not, this indicates that not enough contact points have yet crossed threshold vectors associated with this multi-digit gesture, and the process reverts to looking for crossed threshold vectors until another digit also crosses a threshold vector associated with this gesture. In other words, for a multi-digit gesture, threshold vectors for each of the digits are crossed before the gesture is triggered. For example, for a two-digit gesture, then two thresholds are crossed (one for each digit) before the gesture is triggered.

If, however, it was determined that the same gesture has already previously been stored as a result the requisite number of different digits crossing threshold vectors associated with the gesture, and no more digits are needed for this gesture, then the stored gesture is selected 410 for execution, as described above with reference to FIG. 3.

Figure 5:
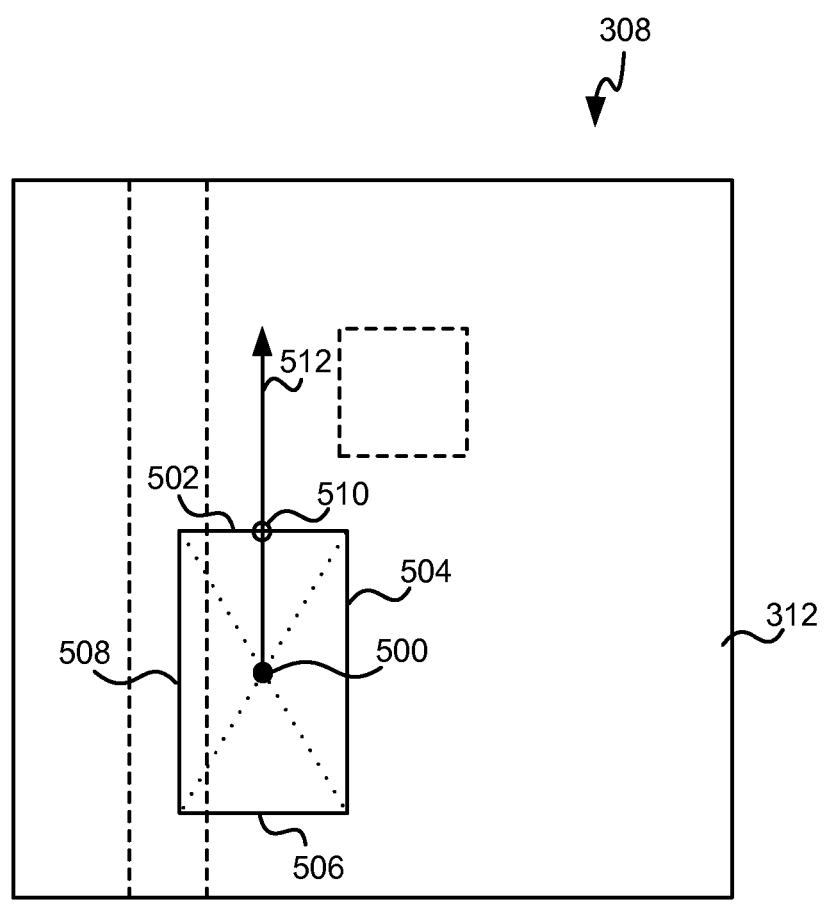
FIG. 5 illustrates the recognition of an example pan gesture.
Figure 6:
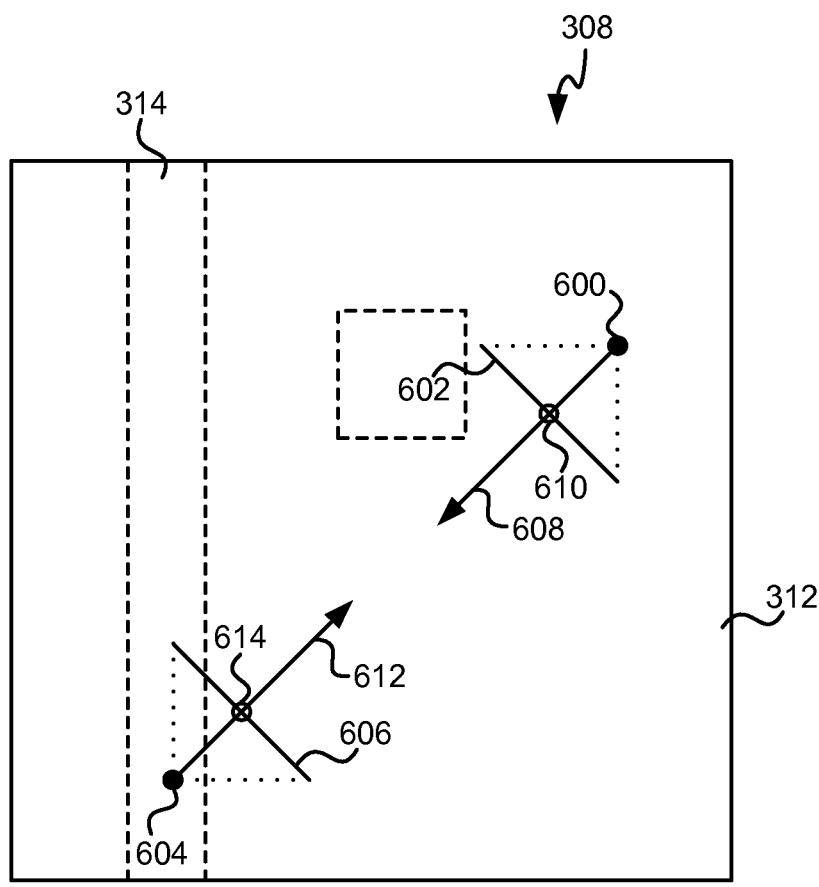
FIG. 6 illustrates the recognition of an example pinch gesture.

Reference is now made to FIGS. 5 and 6, which illustrates examples of the operation of the process in FIG. 4. FIG. 5 illustrates an example of a single-digit gesture, and FIG. 6 illustrates an example of a multiple-digit gesture.

FIG. 5 shows the recognition of an example pan gesture on the plurality of regions 308. The user starts moving their digit from a point on the touch-sensitive portion 104 of the input device 102 that corresponds with start coordinate 500 shown in FIG. 5. Start coordinate 500 is located in the second (finger) region 312. The computing device 108 determines that the second region 312 is associated with a certain set of gestures. A noted above, each gesture in this set of gestures is associated with at least one threshold vector. The computing device 108 determines where each of the threshold vectors for each of the gestures is located, relative to the start coordinate 500.

For example, FIG. 5 shows, as an illustration, a set of four gestures, each having one threshold vector. Shown in FIG. 5 is a pan-up gesture having an associated pan-up threshold vector 502, a pan-right gesture having an associated pan-right threshold vector 504, a pan-down gesture having an associated pan-down threshold vector 506, and a pan-left gesture having an associated pan-left threshold vector 508. In other examples, more gestures can be present in the set of gestures for the second region 312, but these are not illustrated here for clarity.

The combination of the four gestures illustrated in FIG. 5 form a rectangle around the start coordinate 500. At each frame of motion of the user's digit, it is checked whether the current coordinate of the digit has crossed any of the four threshold vectors. In other words, it is determined whether the movement of the user's digit has brought the digit outside the rectangle formed by the four threshold vectors.

FIG. 5 shows the example of the user's digit moving vertically upwards, and at point 510 the path of the movement crosses the pan-down threshold vector 510 (in this example, the movement of the user's digit is interpreted as if it were operating a scroll-wheel, i.e. an upwards stroke by the user produces a downwards scroll). Because the pan-down gesture is a single-digit gesture in this example, the gesture can be triggered immediately by the one digit crossing the threshold. The pan-down gesture is then detected and executed, such that subsequent movement of the user's digit, for example following vertical path 512, is tracked and provides input to control the user interface displayed on display device 110. For example, the user can pan-down over an image displayed in the user interface by an amount related to the vertical path 512 traced by the user's digit (and optionally the speed of the movement).

FIG. 6 shows another example, in this case an example pinch gesture that uses multiple digits. The user starts moving a first digit from a point on the touch-sensitive portion 104 of the input device 102 that corresponds with start coordinate 600 in FIG. 6. This first start coordinate 600 is located in the second region 312. The computing device 108 determines that the second region 312 is associated with a set of gestures, each of which is associated with at least one threshold vector. The computing device 108 determines where each of the threshold vectors for each of the gestures is located, relative to the start coordinate 600.

For clarity, FIG. 6 only shows the threshold vectors for a single gesture, although many other gestures can also be included in other examples. The example gesture shown in FIG. 6 is a pinch gesture, and this has an associated threshold vector 602. Because, this is a pinch gesture, the threshold vector 602 is positioned towards the centre of the touch-sensitive portion relative to the start coordinate 600.

In addition, the user also starts moving a second digit from a point on the touch-sensitive portion 104 of the input device 102 that corresponds with start coordinate 604. This second start coordinate 604 is located in the third region 314. The computing device 108 determines that the third region 314 is associated with a set of gestures, each of which is associated with at least one threshold vector. The computing device 108 determines where each of the threshold vectors for each of these gestures is located, relative to the start coordinate 602. In this example, the third region 314 is also associated with the pinch gesture (no others are shown for clarity). The pinch gesture in this example has a threshold vector 606 relative to start coordinate 604. Again, because this is a pinch gesture, the threshold vector 606 is positioned towards the centre of the touch-sensitive portion relative to the start coordinate 604.

In the FIG. 6 example, the user moves their digit from start coordinate 600 along a path 608, and at point 610, crosses the threshold vector 602. However, because the gesture associated with threshold vector 602 is a two-digit gesture, the gesture is not triggered immediately. Rather, the computing device 108 records that threshold vector 602 has been crossed, and waits until another threshold associated with this gesture is crossed.

The user also moves their other digit from start coordinate 604 along path 612, and crosses threshold vector 606 at point 612. The computing device 108 determines that this is the second digit to cross a threshold vector associated with a pinch gesture, and therefore, as this is a two-digit gesture, it can trigger the execution of the gesture.

Subsequent to triggering the pinch gesture, further movement of the user's digits, for example following paths 608 and 612, is tracked and provides input to control the user interface displayed on display device 110. For example, the user can zoom out from an image displayed in the user interface by an amount related to the size and/or speed of the pinch movement performed by the user's digits.

The above-described gesture recognition technique enables fast and efficient detection of gestures performed on an input device. Knowledge of how the input device is used by the user enables the touch-sensitive portion of the input device to be divided into regions, each associated with a distinct set of gestures. This reduces the amount of time spent searching for matching gestures, as only those that can be performed from certain regions are searched.

The use of threshold vectors to detect and trigger the gestures can be performed rapidly and without extensive computation, unlike shape matching techniques. This allows a large number of gestures to be included with minimal computational overhead. The process operates as a simple "race" to find the first threshold vector that is crossed (by multiple digits in some examples). In addition, the use of threshold vectors ensures that positive movements have to be made to cross a threshold and trigger a gesture, reducing inadvertent gesture triggering.

Note that, once a set of contacts has been recognized as forming a gesture, all other concurrent contacts can be marked to be ignored and the contacts that form the gesture are also made unavailable to other gestures. For example, in the case of a mouse device, if one finger starts a scroll gesture, then all the remaining contacts are taken to be just responsible for holding the mouse device and are not be used in gesture recognition. Similarly, in this example, the scrolling contact can only be part of that scroll gesture, and cannot become part of a two-finger gesture.

Figure 7:
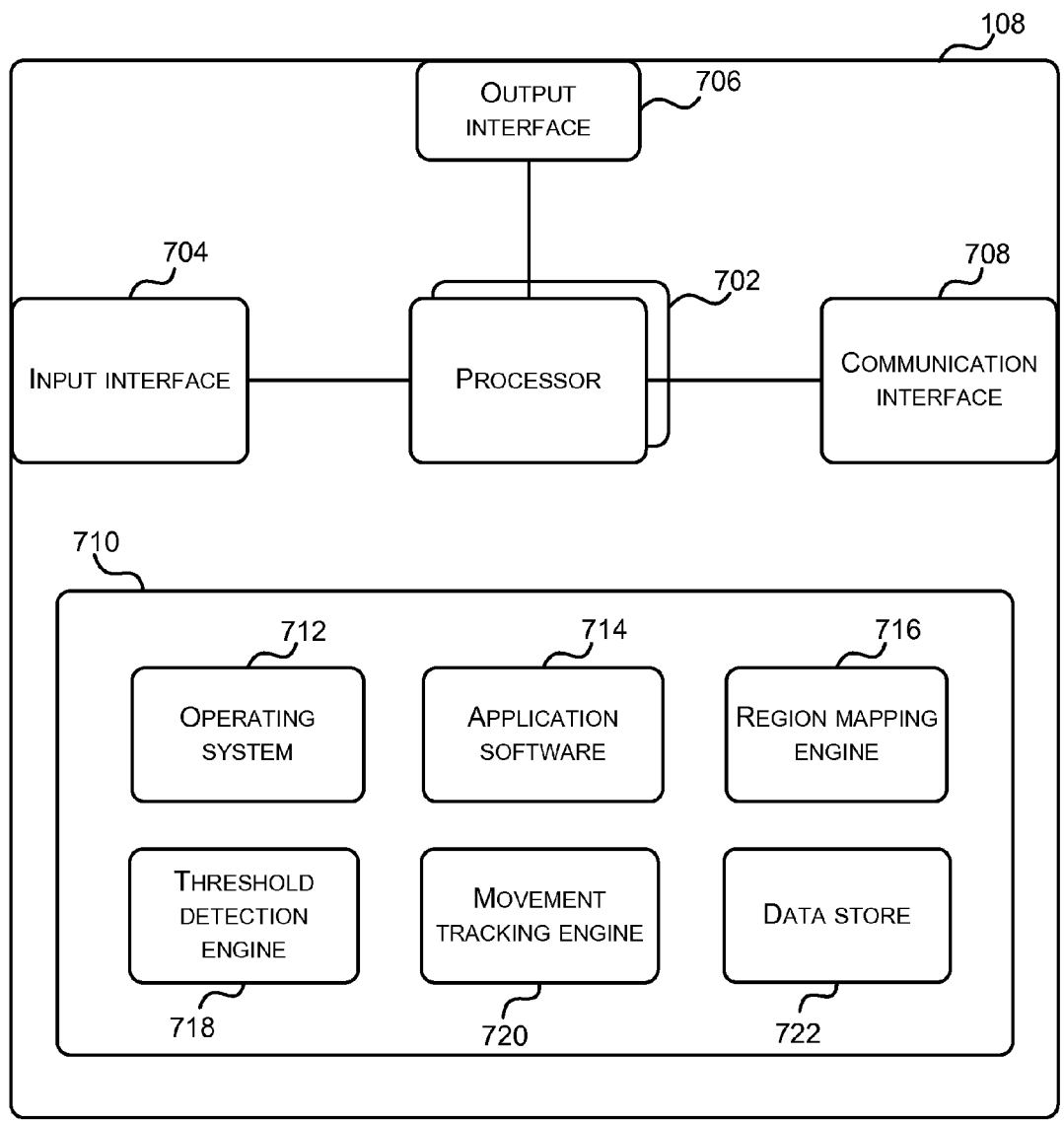
FIG. 7 illustrates an exemplary computing-based device in which embodiments of the gesture recognizer may be implemented.

Reference is now made to FIG. 7, which illustrates various components of computing device 108. Computing device 108 may be implemented as any form of a computing and/or electronic device in which the processing for the gesture recognition techniques may be implemented.

Computing device 108 comprises one or more processors 702 which may be microprocessors, controllers or any other suitable type of processor for processing computer executable instructions to control the operation of the device in order to implement the gesture recognition techniques.

The computing device 108 also comprises an input interface 704 arranged to receive and process input from one or more devices, such as the input device 102. The computing device 108 further comprises an output interface 706 arranged to output the user interface to display device 110.

The computing device 108 also comprises a communication interface 708, which can be arranged to communicate with one or more communication networks. For example, the communication interface 708 can connect the computing device 108 to a network (e.g. the internet). The communication interface 708 can enable the computing device 108 to communicate with other network elements to store and retrieve data.

Computer-executable instructions and data storage can be provided using any computer-readable media that is accessible by computing device 108. Computer-readable media may include, for example, computer storage media such as memory 710 and communications media. Computer storage media, such as memory 710, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (such as memory 710) is shown within the computing device 108 it will be appreciated that the storage may be distributed or located remotely and accessed via a network or other communication link (e.g. using communication interface 708).

Platform software comprising an operating system 712 or any other suitable platform software may be provided at the memory 710 of the computing device 108 to enable application software 714 to be executed on the device. The memory 710 can store executable instructions to implement the functionality of a region mapping engine 616 (arranged to map the regions of the touch-sensitive portion of the input device to a set of gestures), a threshold detection engine 718 (arranged to position the threshold vectors and detect when they are crossed), and a movement and tracking engine 720 (arranged to detect a movement starting and store the start coordinated and track the movement), as described above, when executed on the processor 702. The memory 710 can also provide a data store 724, which can be used to provide storage for data used by the processor 702 when performing the gesture recognition technique.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of detecting gestures performed by a user of an input device having a touch-sensitive portion, comprising:
    loading, at a processor, a definition of a plurality of regions corresponding to zones on the touch-sensitive portion of the input device, a first zone on the touch-sensitive portion being associated with a first digit and a second zone being associated with a second other digit, wherein each region in the plurality of regions is associated with a distinct set of gestures, each gesture having an assigned priority value;
    receiving, at the processor, data describing movement of at least one digit of the user across a regional boundary of the touch-sensitive portion of the input device;
    determining, from the data and the definition of the plurality of regions, an associated region for the data;
    determining a comparison order based on the assigned priority value;
    comparing the data to the set of gestures for the associated region and selecting a gesture applicable to the data, the data being compared to the gestures in the determined comparison order; and
    executing, on the processor, a command associated with the gesture selected.

2. A method according to claim 1, wherein the data comprises a start coordinate for each digit.

3. A method according to claim 2, wherein the data further comprises a current coordinate for each digit.

4. A method according to claim 3, wherein each gesture in each set of gestures is defined by at least one threshold vector located at a predefined position relative to the start coordinate.

5. A method according to claim 4, wherein comparing comprises: for each digit, comparing the current coordinate to each threshold vector in the set of gestures for the associated region to determine whether the movement of the digit from the start coordinate has crossed that threshold vector, and, if so, storing the gesture associated with that threshold vector.

6. A method according to claim 5, wherein, in the case that the gesture stored is a single-digit gesture, the step of selecting a gesture applicable to the data comprises selecting the gesture stored.

7. A method according to claim 5, wherein, in the case that the gesture stored is a gesture using input from a predefined number of digits, selecting a gesture applicable to the data comprises selecting the gesture if a same gesture is stored for the predefined number of digits.

8. A method according to claim 5, wherein the priority value of the gesture is based on a frequency of use of the gesture, and comparing comprises comparing the current coordinate to each threshold vector in the associated region's set to gestures to determine whether the movement of the digit from the start coordinate has crossed that threshold vector.

9. A method according to claim 3, further comprising detecting from the data that a digit has not moved from its current coordinate for more than a predefined time period, and, if so, replacing the start coordinate with the current coordinate for that digit.

10. A method according to claim 1, wherein the gestures are selected from a group consisting of a momentary gesture and a continuous gesture.

11. A method according to claim 1, wherein the assigned priority value of the gesture is based at least in part on a time-sensitivity of the gesture.

12. A method according to claim 1, wherein the command is selected from a group consisting of: a zoom command, a scroll command; a command to maximize a window; a command to minimize a window; and a command to switch windows.

13. A method according to claim 1, further comprising generating an output value from the data relating to at least one of a magnitude or direction of the movement.

14. A method according to claim 13, further comprising providing the output value as an argument to the command associated with the gesture selected.

15. A computer system, comprising: a memory;
    an output interface;
    an input interface arranged to receive data from an input device having a touch-sensitive portion, the data describing movement of at least one digit of a user across a regional boundary of the touch-sensitive portion; and
    a processor arranged to display a user interface on a display device via the output interface, load from the memory a definition of a plurality of regions corresponding to zones on the touch-sensitive portion of the input device, a first zone on the touch-sensitive portion being associated with a first digit and a second zone being associated with a second other digit, each region in the plurality of regions having a distinct set of gestures associated therewith and each gesture having a priority value, determine a comparison order based on the priority value, determine from the data and the definition of the plurality of regions an associated region for the data, compare the data to the set of gestures for the associated region to select a gesture applicable to the data, the gestures being compared to the data in the determined comparison order, and update the user interface via the output interface in accordance with a function associated with the gesture selected.

16. A computer system according to claim 15, wherein the input device is a multi-touch mouse device.

17. A computer system according to claim 15, wherein zones on the touch-sensitive portion of the input device correspond to areas of the touch-sensitive portion that are associated with one or more digits of the user.

18. A computer system according to claim 17, wherein the zones on the touch-sensitive portion of the input device comprise a thumb zone that is predominantly in contact with a thumb of the user.

19. A computer system according to claim 17, wherein the zones on the touch-sensitive portion of the input device comprise a finger region that is predominantly in contact with one or more fingers of the user.

20. One or more computer storage devices with device-executable instructions that, when executed by a computing system, direct the computing system to perform operations comprising:
    loading, at a processor, a definition of a plurality of regions corresponding to zones on a touch-sensitive portion of an input device, a first zone on the touch-sensitive portion being associated with a first digit and a second zone being associated with a second other digit, wherein each region in the plurality of regions is associated with a distinct set of gestures and each gesture has an assigned priority value;

receiving, at the processor, data describing movement of at least one digit of a user across a regional boundary of the touch-sensitive portion of the input device, wherein the data comprises a start location and a current location for the digit;

determining, from the start location and the definition of the plurality of regions, an associated region for the data, and, for each gesture in the set of gestures for the associated region, calculating a position for at least one threshold vector relative to the start location;

determining a comparison order based on the assigned priority value;

comparing the current location to each threshold vector in the set of gestures for the associated region, the comparison being done in the determined comparison order, to determine whether the movement of the digit from the start location has crossed that threshold vector, and, if so, selecting the gesture associated with that threshold vector; and executing a command associated with the gesture selected.

* * * * *